(No Model.)
F. L. GOLIBART.
GRASS RECEIVER FOR LAWN MOWERS.
No. 481,277. Patented Aug. 23, 1892.
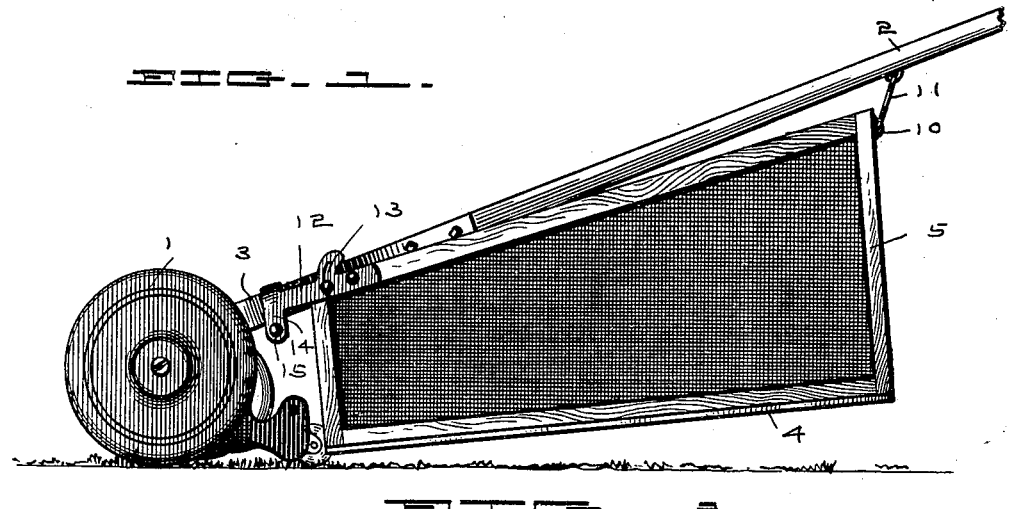
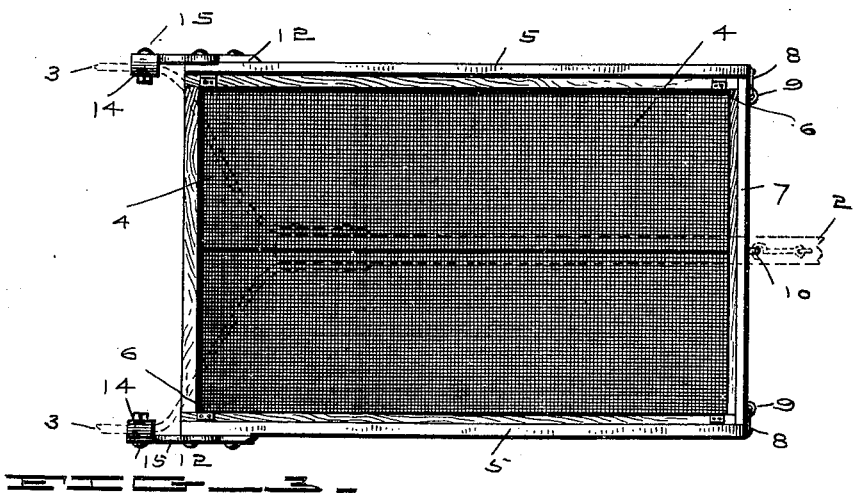
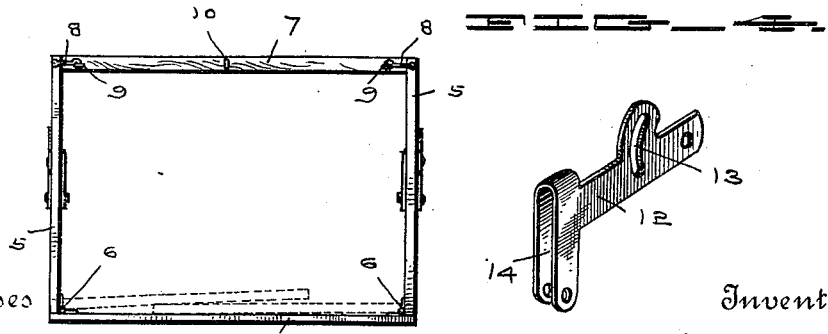
Witnesses
H. D. Nealy
C. B. Griffith
Inventor
Francis L. Golibart,
By his Attorney
V. H. Lockwood.

UNITED STATES PATENT OFFICE.

FRANCIS L. GOLIBART, OF INDIANAPOLIS, INDIANA.

GRASS-RECEIVER FOR LAWN-MOWERS.

SPECIFICATION forming part of Letters Patent No. 481,277, dated August 23, 1892.

Application filed May 7, 1892. Serial No. 432,114. (No model.)

*To all whom it may concern:*

Be it known that I, FRANCIS L. GOLIBART, of Indianapolis, county of Marion, and State of Indiana, have invented certain new and useful Improvements in Grass-Receivers for Lawn-Mowers; and I do hereby declare that the following is a full, clear, and exact description thereof, reference being had to the accompanying drawings, in which like figures refer to like parts.

My invention relates to a new and useful improvement in grass-receivers for lawn-mowers; and its construction is such as to adapt it for use on any of the ordinary forms and sizes of mowers and when taken off to allow it to be stowed away in a very small compass.

Referring to the drawings, Figure 1 is a side elevation of my improved receiver attached to a lawn-mower. Fig. 2 is a plan view of the receiver, the handle of the mower being shown in dotted lines. Fig. 3 is a rear end view of the same, the dotted lines indicating the position of the side wings when folded. Fig. 4 is a detail perspective view of one of the supporting-brackets.

In detail, 1 represents a lawn-mower of any ordinary type, 2 the handle of the same, and 3 the connecting-arms between the handle and the machine. The grass-receiver itself is formed of a framework covered, preferably, with wire-gauze or similar material, and consists of a bottom 4 and the two side wings 5, these being hinged at 6, as shown in Fig. 2.

7 is a removable cross-piece, which is attached to the two side wings at the rear end of the receiver by hooks 8, which engage with staples 9, 10 being a central staple secured to this cross-piece, and 11 a hook secured on the under side of the mower-handle for supporting the rear end of the receiver.

12 are brackets formed of sheet or other flexible metal secured to the outside of the side wings of the receiver at their forward ends, and are secured to such sides by screw-bolts, one of these working in a slot 13 in the bracket, allowing the receiver to be adjusted vertically. The forward ends of the brackets 12 form hooks 14, which are adapted to fit over the top of the handle-arms 3, as shown in Fig. 1, and when so placed are retained in position by the bolts 15 through holes in the lower end. Both ends of the receiver are open, the grass being thrown from the machine directly into the forward end, the angle on which the receiver is set preventing any grass from being thrown up as far as the rear end, and even were the bottom of the receiver flat at no time would the grass be thrown out of the receiver. The cut grass in the forward end of the receiver may, if desired, be drawn back by the person operating the mower, while the same is being operated, by a light small rake or by hand. When it is desired to empty or dump the receiver, this is done by turning the mower forward. Owing to the side wings being hinged, when it is desired to remove the receiver from the machine and stow it away at the end of the season it can be folded up, as shown in Fig. 3, thus taking up very little space, and will not be liable to be broken or otherwise damaged, as it would if always retained in its open position. At the same time this is a great advantage in shipment, allowing a large number to be packed in a very small space and, as before stated, greatly reducing the chances of breakage.

The object of making the brackets 12 of sheet or flexible metal is that in some cases the width of the arms of the machine varies, and the brackets can then be bent in either direction to fit on these arms, and when once fitted they are always in the right position to be put on the machine at any time.

What I claim as my invention, and desire to secure by Letters Patent, is the following:

1. In a grass-receiver for lawn-mowers, brackets secured to the forward ends of the sides of such receiver by screw-bolts and a slot in each of such brackets through which one of such screw-bolts works, the forward ends of such brackets divided into two flanges which are adapted to fit over the arms of a lawn-mower handle, the lower ends of such flanges to be clamped together by a suitable screw-bolt, whereby such receiver may be attached to different kinds of lawn-mowers, substantially as shown and described.

2. A grass-receiver for lawn-mowers, consisting of a bottom piece, two side wings connected thereto, a removable cross-piece connecting the rear of such side wings, such cross-piece centrally attached by a bolt to the handle of the lawn-mower, brackets secured to the forward ends of such side wings by screw-bolts, and a slot on each of such brackets through which one of such screw-bolts works, the other ends of such brackets provided with two flanges adapted to fit over the arms of the lawn-mower handle and to be clamped to the same by screw-bolts, substantially as shown and described.

In witness whereof I have hereunto set my hand this 2d day of May, 1892.

FRANCIS L. GOLIBART.

Witnesses:
H. D. NEALY,
E. B. GRIFFITH.